US011953812B2

(12) United States Patent
Yasutake (10) Patent No.: US 11,953,812 B2
(45) Date of Patent: Apr. 9, 2024

(54) IMAGE PICKUP DEVICE

(71) Applicant: CANON KABUSHIKI KAISHA, Tokyo (JP)

(72) Inventor: Yuta Yasutake, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/180,567

(22) Filed: Mar. 8, 2023

(65) Prior Publication Data

US 2023/0221622 A1 Jul. 13, 2023

Related U.S. Application Data

(63) Continuation of application No. 17/552,693, filed on Dec. 16, 2021, now Pat. No. 11,619,865.

(30) Foreign Application Priority Data

Dec. 18, 2020 (JP) ................................ 2020-210620

(51) Int. Cl.
*G03B 13/36* (2021.01)
*G03B 13/20* (2021.01)
*G03B 17/14* (2021.01)
*G03B 17/56* (2021.01)

(52) U.S. Cl.
CPC ........... *G03B 17/561* (2013.01); *G03B 13/20* (2013.01); *G03B 13/36* (2013.01); *G03B 17/14* (2013.01)

(58) Field of Classification Search
CPC ........ G03B 17/02; G03B 17/12; G03B 17/14; G03B 13/20; F16M 11/06; F16M 11/08; F16M 11/10; F16M 11/12
See application file for complete search history.

(56) References Cited

U.S. PATENT DOCUMENTS

| 5,440,369 A | * | 8/1995 | Tabata | ................. G03B 7/20 396/234 |
| 6,173,120 B1 | * | 1/2001 | Takatori | ................. G03B 17/32 396/36 |
| 7,855,728 B2 | | 12/2010 | Aoki et al. | |
| 2022/0272236 A1 | * | 8/2022 | Yamagata | ............. H04N 23/52 |

FOREIGN PATENT DOCUMENTS

JP 2005-203907 A 7/2005
KR 101447518 B1 * 10/2014 ............. G03B 17/02

* cited by examiner

*Primary Examiner* — Christopher E Mahoney
(74) *Attorney, Agent, or Firm* — Cowan, Liebowitz & Latman, P.C.

(57) ABSTRACT

An image pickup device, provided with a camera unit that is provided with a lens barrel, an autofocus unit disposed on the outside of the lens barrel, a lens barrel holding member that holds the lens barrel, and a camera case that engages the lens barrel holding member and covers the autofocus unit, the camera unit provided with a base member that supports the camera unit rotatably around a rotation axis, and a regulating member that restricts the rotation of the camera unit to a first rotation range. In the image pickup device, the camera case engages with the lens barrel holding member when the camera unit is in the first rotation range, the regulating member being detachable, and the camera case being detachable from the lens barrel holding member when the camera unit is in the second rotation range.

13 Claims, 10 Drawing Sheets

IMAGE PICKUP DEVICE

CROSS-REFERENCE TO RELATED APPLICATIONS

This application is a continuation of application Ser. No. 17/552,693, filed Dec. 16, 2021, the entire disclosure of which is hereby incorporated by reference.

BACKGROUND OF THE INVENTION

Field of the Invention

The present invention relates to an image pickup device, and in particular, relates to a rotatable image pickup device equipped with a focus detection system using external measurement phase difference detection.

Description of the Related Art

In recent years, image pickup devices used for recording and broadcasting lectures and live streaming of concerts and the like have been provided with a pan and tilt mechanism that enables the image pickup device to pan and tilt with respect to an installation surface so that a wide area can be captured. For example, Japanese Patent Laid-Open No. 2005-203907 discloses an image pickup device that allows pan rotation of ±170° and tilt rotation from −30° to +90°.

In addition, as an AF (autofocus) system, some image pickup devices provided with a pan/tilt mechanism are provided with a hybrid AF system that combines a contrast AF system and an external measurement phase-difference AF system so as to achieve faster focusing performance. A contrast AF system is a common AF system mounted in image pickup devices. A signal indicating the focus state is generated by extracting high-frequency components from the video signal obtained using an image pickup device, and the position of the focus lens is controlled so that the signal is maximized. An external phase difference AF system uses light that does not pass through the image pickup system to directly detect the distance to the object by using an AF sensor (autofocus sensor), and controls the position of the focus lens based on the detected distance.

In an image pickup device equipped with a hybrid AF system, it is necessary to adjust the orientation of the unit having an AF sensor (hereinafter referred to as the external AF unit) in order to substantially align the optical axis of the AF sensor with the optical axis of the imaging system. The orientation of the external AF unit is adjusted by rotating an eccentric pin that is in contact with the external AF unit with a tool such as a screwdriver, while the image pickup device is positioned to be directly opposed to a chart for outputting an image. However, if the eccentric pin is moved after the product is sold, the orientation of the external AF unit is required to be readjusted. Therefore, in order to prevent tampering, that is, to prevent the eccentric pin from being moved unnecessarily, it is desirable to dispose the eccentric pin in a position where it cannot be easily touched by the user.

In contrast, it is desirable to be able to adjust the orientation of the external AF unit while the image is ready to be output, without having to remove many parts, because the orientation of the external AF unit may need to be adjusted in customer service after the product is sold. Here, the external AF unit is generally disposed below the image pickup device from the viewpoint of design. Therefore, it is desirable that, when adjusting the orientation of the external AF unit in an image pickup device provided with a pan/tilt mechanism, a chart can be placed on a wall or other surface, and the external AF unit fixed at a predetermined rotation angle so that the eccentric pin, which is required to be rotated with a tool such as a screwdriver, is exposed.

However, as disclosed in Japanese Patent Laid-Open No. 2005-203907, in an image pickup device with a maximum tilt angle of less than 180° as a specification limitation, when the external AF unit is disposed below the image pickup device, it is not easy to readjust the orientation of the external AF unit in customer service.

SUMMARY OF THE INVENTION

Embodiments of the present invention include an image pickup device wherein the camera unit is rotatable around a rotation axis, and the image pickup device is provided wherein the AF unit can be easily adjusted while preventing unnecessary contact by the user to the AF unit of the external measurement system.

One embodiment of the present invention is characterized in a camera unit provided with a lens barrel, an autofocus unit disposed on the outside of the lens barrel, a lens barrel holding member that holds the lens barrel, and a camera case that engages the lens barrel holding member and covers the autofocus unit, the camera unit provided with a base member that supports the camera unit rotatably around a rotation axis, and a regulating member that restricts the rotation of the camera unit to a first rotation range, the camera case engaging with the lens barrel holding member when the camera unit is in the first rotation range, the regulating member being detachable, and the camera case being detachable from the lens barrel holding member when the camera unit is in the second rotation range.

Further features of the present invention will become apparent from the following description of exemplary embodiments with reference to the attached drawings.

DESCRIPTION OF THE EMBODIMENTS

In the present embodiment, an example of the implementation of an imaging device to which the present invention has been applied will be explained.

Figure 1:
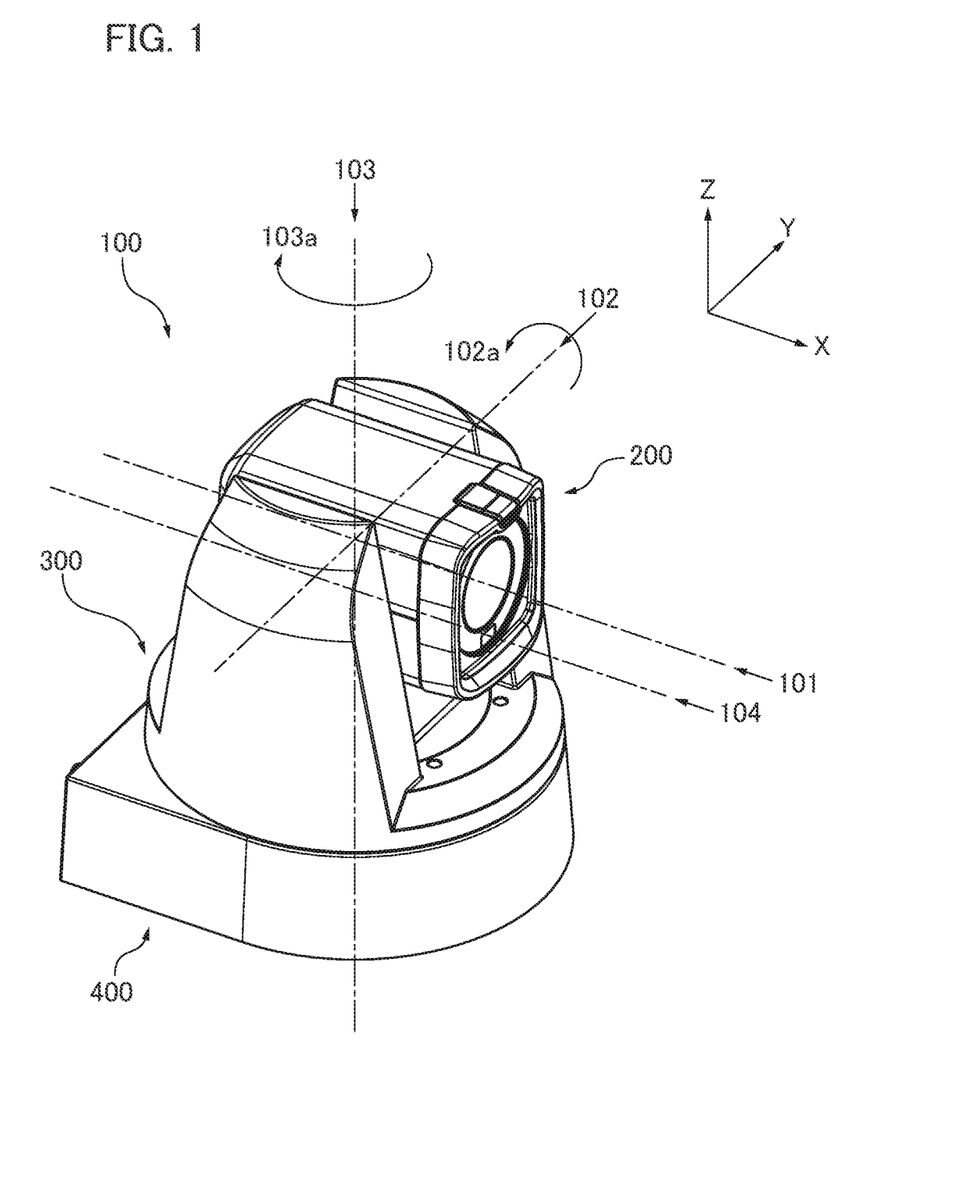
FIG. 1 is a perspective view of an image pickup device in the embodiment of the present invention.

FIG. 1 is a perspective view of an image pickup device 100 according to the present embodiment. The image pickup device 100 is provided with a camera unit 200, a pan unit 300, and a bottom unit 400. In addition, the image pickup device 100 can be tilted and rotated around a tilt axis 102 that is substantially parallel with respect to the installation surface and orthogonal with respect to an optical axis 101 of the imaging system, and panned and rotated around a pan axis 103 that is orthogonal to the installation surface. Furthermore, as an AF system, the image pickup device 100 is equipped with a hybrid AF system that combines a conventional contrast AF system with an external phase-difference AF system using an external AF unit (autofocus unit) 215 described hereinafter. In addition, the drive of the focus lens group of a lens barrel 201 disposed within the camera unit 200 is controlled based on the focus state detected by both AF systems. Note that an AF sensor optical axis 104 is required to be substantially aligned with the optical axis 101 of the imaging system by adjusting the orientation of the external AF unit 215 so that an accurate focus state can be detected.

Below, a basic position in FIG. 1 is defined as a pan angle of 0° and a tilt angle of 0°, and direction 102a is defined as the positive direction of tilt rotation and direction 103a as the positive direction of pan rotation. In addition, in the basic position illustrated in FIG. 1, the X-axis+side is defined as "front", the X-axis−side as "rear", the Z-axis+side as "top", and the Z-axis−side as "bottom".

Figure 2:
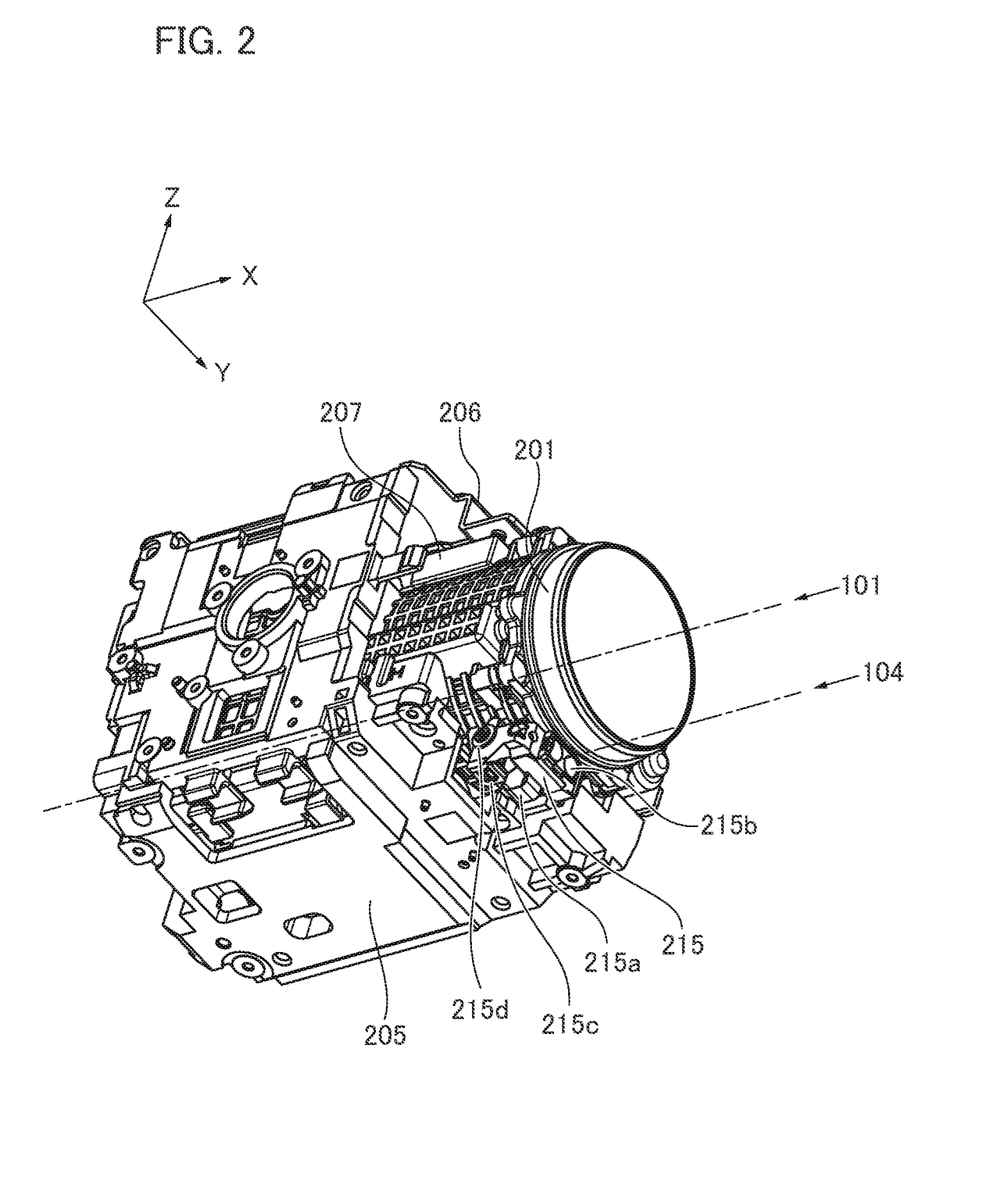
FIG. 2 is a perspective view of the peripheral area of the lens barrel.
Figure 3:
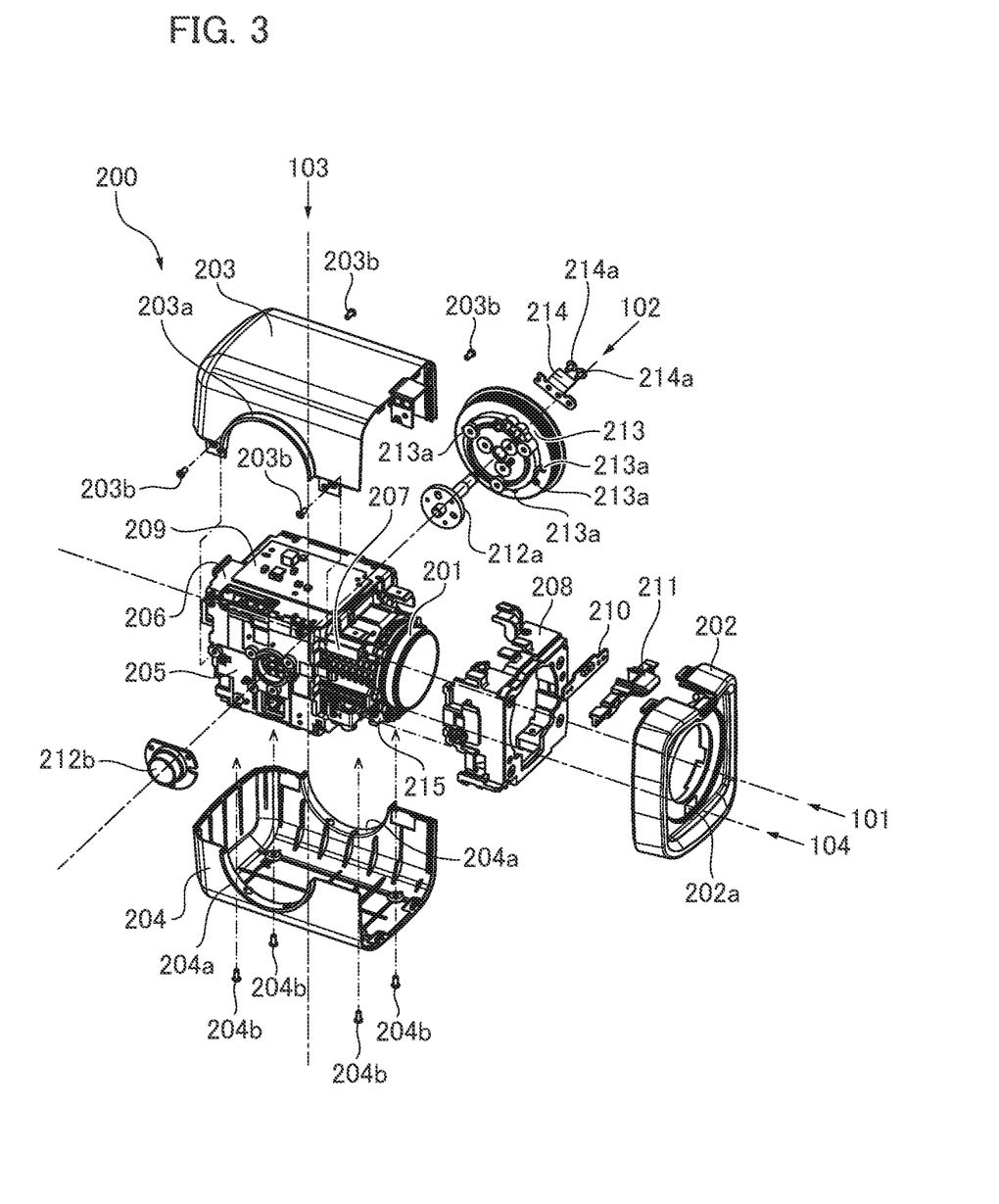
FIG. 3 is an exploded perspective view of the camera unit.
Figure 4:
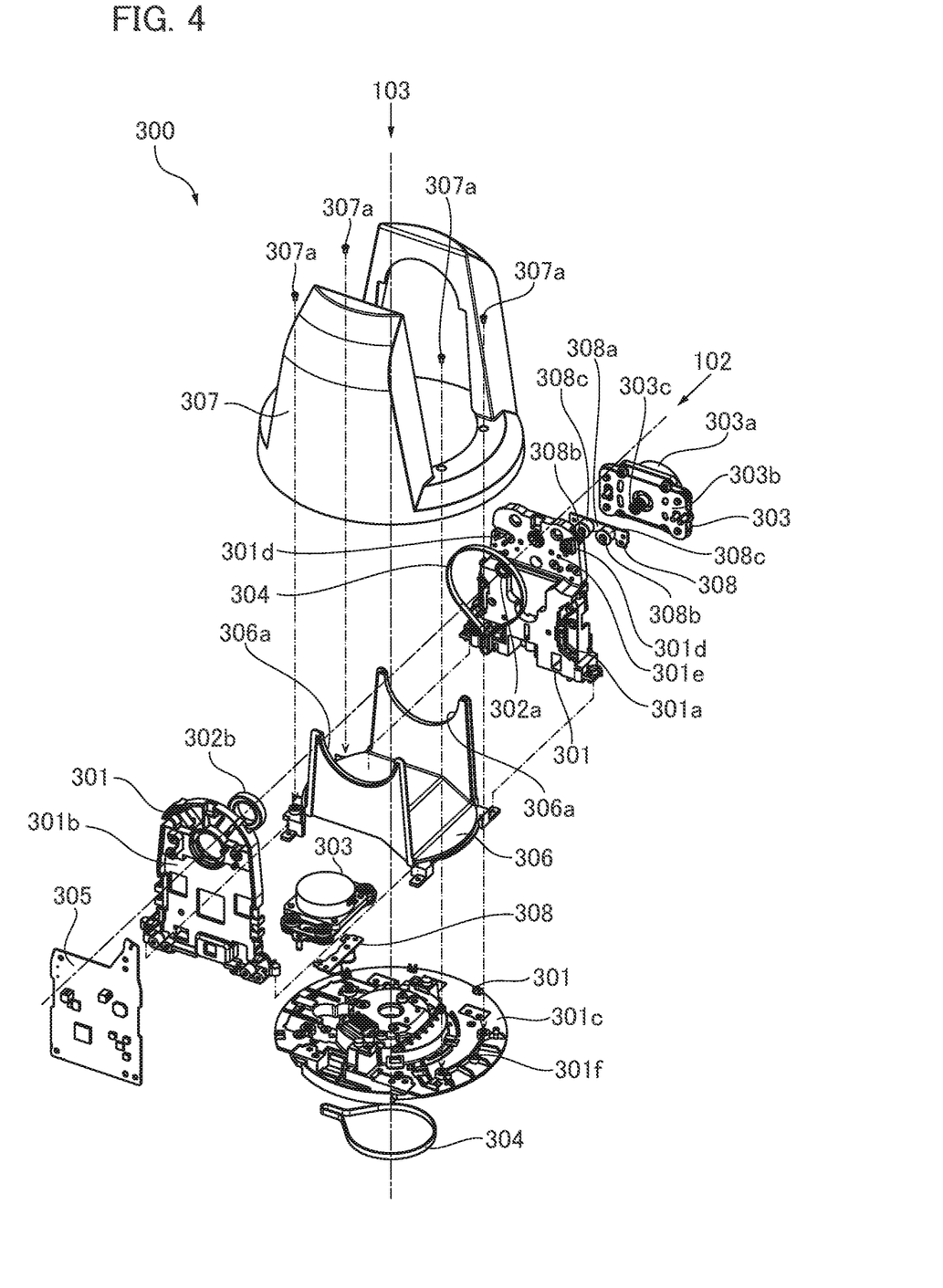
FIG. 4 is an exploded perspective view of the pan unit.
Figure 5:
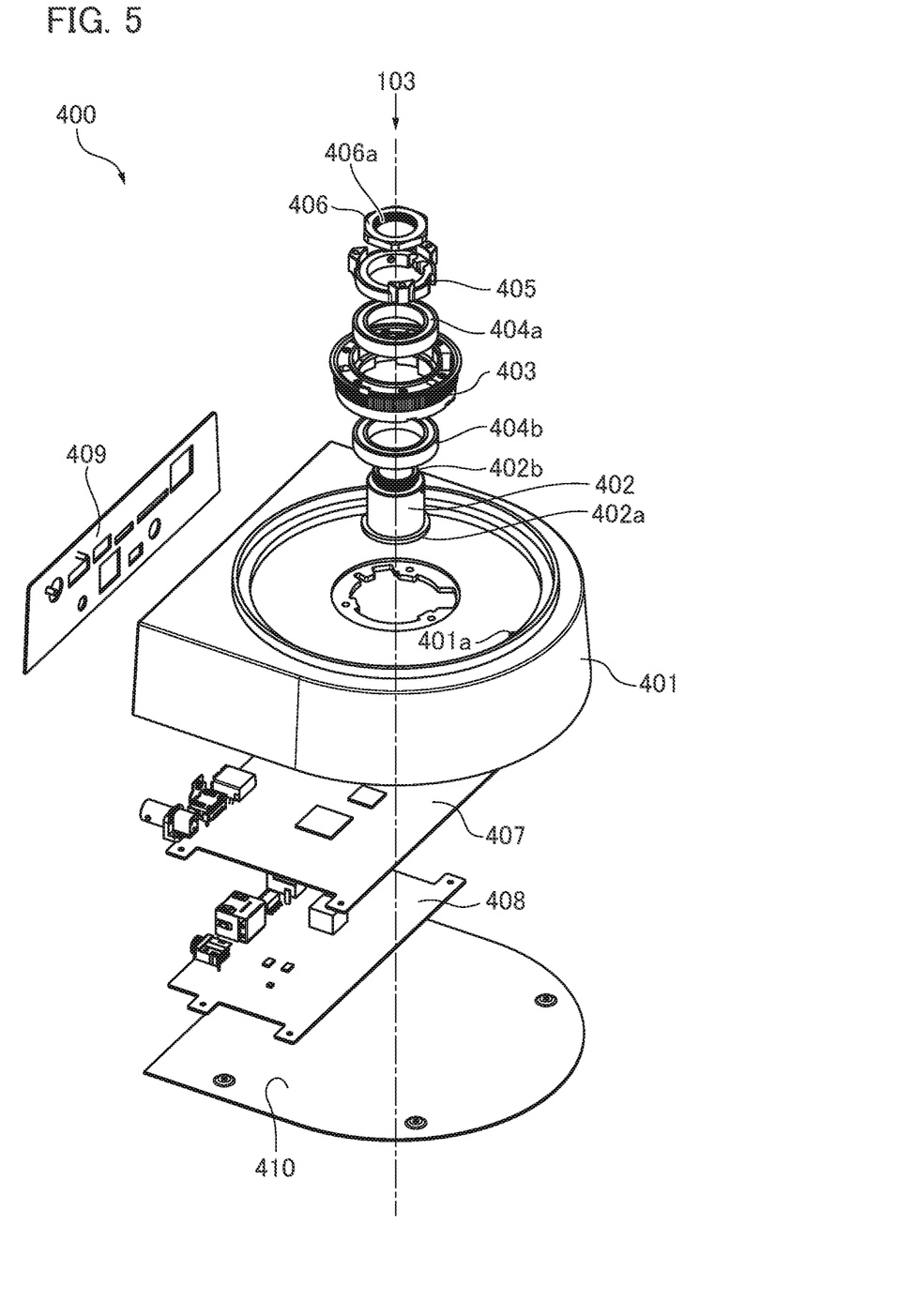
FIG. 5 is an exploded perspective view of the bottom unit.

FIG. 2 is a perspective view of the peripheral area of the lens barrel 201. FIG. 3 is an exploded perspective view of the camera unit 200. FIG. 4 is an exploded perspective view of the pan unit 300. FIG. 5 is an exploded perspective view of the bottom unit 400.

First, referring to FIGS. 2 and 3, the configuration of the camera unit 200 will be explained. The lens barrel 201 is provided with a lens group such as a focus lens group (not illustrated) and lens holding member, and an imaging substrate on which an image sensor is mounted, and the optical axis 101 direction of the imaging system can be captured.

The lens barrel 201 is fixed to a lens barrel holding member 205, which is formed of a resin and the like. An elastic member 207 formed of elastomer or the like is provided on the upper surface of the lens barrel 201, and a retaining member 206 is fixed to the lens barrel holding member 205 by pressing on the elastic member 207. The retaining member 206 is preferably formed of sheet metal.

A lens drive substrate 209 is fixed to the top surface of the retaining member 206 and controls the lens drive of the focus lens group and the like of the lens barrel 201.

The external AF unit 215 is provided with an AF sensor (not illustrated) which is mounted on a flexible printed substrate 215a, a lens 215b, and an eccentric pin 215c. The orientation of the external AF unit 215 is adjustable by rotating the eccentric pin 215c with a tool such as a screwdriver. The external AF unit 215 is disposed on the outside of the lens barrel 201. During product assembly or customer service, the orientation of the external AF unit is adjusted so that the AF sensor optical axis 104 is substantially aligned with the optical axis 101 of the imaging system. In this state, the external AF unit 215 is fixed to the lower part of the lens barrel 201 with a fixing screw 215d.

A front camera case 202 has a window portion 202a in the lower part for light to enter the AF sensor, and is fixed to the lens barrel holding member 205 and the retaining member 206 via a front camera case holding member 208 formed of resin and the like. A tally lamp substrate 210 and a tally lamp guide 211 are fixed to the top portion of the front camera case 202. LEDs are mounted on the tally lamp substrate 210, and light from the LEDs is guided by the tally lamp guide 211 and emits externally, functioning as a tally lamp to convey the shooting state of the image pickup device 100 to the subject.

A first tilt shaft 212a is a solid shaped part consisting of metal and is fixed to a tilt gear 213 with a diameter fit. A second tilt shaft 212b is a hollow-shaped component consisting of metal. A cable (not illustrated) that transmits the output signal of the image sensor, power for driving the lens, and the like, is inserted into the hollow portion. The tilt gear 213, to which the first tilt shaft 212a is fixed, and the second tilt shaft 212b are fixed to the lens barrel holding member 205 so that the central axes of both become coaxial.

As will be described hereinafter in detail, a tilt rotation regulating member 214 is a member that restricts the tilt rotation of the camera unit 200 to a first tilt rotation range and is fixed to the tilt gear 213 by fixing screws 214a. Note that here, as an example, the first tilt rotation range is between −35° and +105°.

An upper camera case 203 having semicylindrical portions 203a centered on the tilt axis 102 is fixed to the lens barrel holding member 205 and the front camera case holding member 208 from both sides by fixing screws 203b.

A lower camera case 204 having semicylindrical portions 204a centered on the tilt axis 102 is fixed to the lens barrel holding member 205 from the bottom surface by fixing screws 204b, and covers the fixing screws 203b of the upper camera case 203 and the external AF unit 215. Note that the front camera case 202, the upper camera case 203, and the lower camera case 204 are external members.

In the camera unit 200 configured as described above, the first tilt shaft 212a is inserted into a first tilt bearing 302a, and the second tilt shaft 212b is inserted into a second tilt bearing 302b. A timing belt 304 is wound around the tilt gear 213 and a pinion gear 303c for tilt rotation, enabling tilt rotation around the tilt axis 102 with respect to the pan unit 300.

Next, referring to FIG. 4, a configuration related to the pan unit 300 will be described. A pan base 301 includes a first pan base 301a, a second pan base 301b, and a third pan base 301c, which are formed of resin, metal, or the like. Note that in the present embodiment, the pan base 301 includes three parts, but it may be formed integrally, that is, by a single part. The pan base 301 may be a base member that supports the camera unit 200 in a tilt rotatable manner.

The first pan base 301a is provided with a convex shape 301d against which the tilt rotation regulating member 214 described above abuts during tilt rotation of the camera unit 200. As a result, the tilt rotation of the camera unit 200 is physically restricted to the first tilt rotation range (in the present embodiment, between −35° and +105°). In addition, when the tilt rotation regulating member 214 is formed of sheet metal, impact noise is reduced by the resiliency of the bent portion when the tilt rotation regulating member 214 abuts the convex shape 301d of the first pan base 301a.

An image substrate 305, on which an image engine that processes the output signals of the image sensor is mounted, is fixed to the second pan base 301b. The image substrate 305 is connected to the imaging substrate and lens drive substrate 209 described above and to a control substrate 407 described below by a cable (not illustrated).

The outer rings of the first tilt bearing 302a and the second tilt bearing 302b are fitted and supported in the stepped through-holes of the first pan base 301a and the second pan base 301b, respectively.

A motor unit 303 is provided with a stepping motor 303a, a motor holding member 303b, and a pinion gear 303c. The stepping motor 303a is fixed to the motor holding member 303b, and the pinion gear 303c is press-fitted to a motor rotation shaft. The motor holding member 303b is provided with two sheets of sheet metal and an elastic member such as rubber clamped between the sheets of sheet metal. The elastic member reduces oscillation and noise when the stepping motor 303a is driven.

In the present embodiment, the same motor unit 303 is used for pan rotation and tilt rotation. In addition, in the motor unit 303 used for pan rotation, the motor holding member 303b is fixed to the third pan base 301c, and in the motor unit 303 used for tilt rotation, the motor holding member 303b is fixed to the first pan base 301a.

In addition, the timing belt 304 is wound around the pinion gear 303c for pan rotation and a pan gear 403 described below, and the pinion gear 303c for tilt rotation and the tilt gear 213 described above, respectively.

Further, an idler unit 308 is disposed between the pinion gear 303c for pan rotation and the pan gear 403, and between the pinion gear 303c for tilt rotation and the tilt gear 213, respectively. The idler unit 308 is provided with a support base 308a formed of sheet metal or the like, an idler shaft 308b, and idler bearings 308c. The idler shaft 308b is fixed to the support base 308a, and the idler bearings 308c are inserted and thereby mounted on the idler shaft 308b. The idler bearings 308c are disposed between the pinion gear 303c for pan rotation and the pan gear 403, and between the pinion gear 303c for tilt rotation and the tilt gear 213, respectively, so as to be opposed by clamping the timing belt 304 from the outside. As a result, the number of meshing teeth between the pinion gear 303c and the timing belt 304 can be increased.

An inner case 306 is fixed to the first pan base 301a and the second pan base 301b, and has cutout parts 306a of a substantially semicircular shape. In a first tilt rotation range (from −35° to +105°), at least a part of the semicylindrical portions 204a of the lower camera case 204 is positioned inside the cutout parts 306a of a substantially semicircular shape. An outer case 307 is fixed to the third pan base 301c and the inner case 306 by fixing screws 307a. In other words, the inner case 306 and the outer case 307 are the exterior members that cover the pan base 301 and can be said to be a base case.

In the pan unit 300 configured as described above, the third pan base 301c is fixed to a pan base holding member 405. As a result, as will be described hereinafter in detail, it is possible to pan and rotate around the pan axis 103 together with the pan base holding member 405 with respect to the fixed portion of the bottom unit 400.

Next, referring to FIG. 5, the configuration with respect to the bottom unit 400 will be explained. The outer rings of a first pan bearing 404a and a second pan bearing 404b are fitted and supported in the stepped-through holes of the pan gear 403.

A pan shaft 402 is a hollow-shaped component consisting of metal, and a cable (not illustrated) that transmits a video signal, electric power, and the like, is inserted into the hollow portion. In addition, the pan shaft 402 has a flange portion 402a and is inserted against the inner rings of the first pan bearing 404a and the second pan bearing 404b until the flange portion 402a is in contact with the end face of the inner ring of the second pan bearing 404b. Further, the pan shaft 402 has a male threaded portion 402b on the opposite side of the flange portion 402a.

A pan shaft fixing nut 406 has a female threaded portion 406a formed on its inner diameter which threadedly engages with the male threaded portion 402b. The pan base holding member 405 is diametrically fitted to the pan shaft 402 and is fixed in a position where its end face is in contact with the end face of the inner ring of the first pan bearing 404a by tightening the pan shaft fixing nut 406 against the pan shaft 402 with a specified rotational torque. The pan shaft fixing nut 406 is tightened against the pan shaft 402 with a specified rotational torque to provide a predetermined pressurization amount to the first pan bearing 404a and the second pan bearing 404b.

The bottom case 401 is a fixed portion that does not rotate, and is formed of a metal such as die-cast. The pan gear 403 is fixed to the bottom case 401, and the timing belt 304 is wound around the pan gear 403 and the pinion gear 303c for pan rotation. By this kind of configuration, the pan shaft 402, the pan base holding member 405, and the pan shaft fixing nut 406 can pan and rotate around the pan axis 103 with respect to the bottom case 401 and the pan gear 403, which are the fixed portions. Thus, as described above, the pan unit 300, which is fixed to the pan base holding member 405 via the third pan base 301c, can pan and rotate around the pan axis 103 relative to the fixed portion of the bottom unit 400.

The control substrate 407 is mounted with a network engine for network communication, SDI output terminal, HDMI (trademark) terminal, USB terminal, LAN terminal, and the like, and is fixed to the bottom case 401.

A power supply board 408 is mounted with circuits for power supply, power input terminals, audio input terminals, and the like, and is fixed to the bottom case 401.

A rear plate 409 has a notch shape aligned with a terminal shape mounted on the control substrate 407 and the power supply board 408, and is fixed to the bottom case 401.

A bottom plate 410 is fixed to the bottom case 401, and the image pickup device 100 can be installed on a ceiling or wall via the bottom plate 410 by using fixing screws (not illustrated).

Next, the tamper-resistance of the external AF unit 215 will be explained. In the image pickup device 100, as described above, the tilt rotation range of the camera unit 200 is restricted by the tilt rotation regulating member 214 to the first tilt rotation range (−35° to) +105°). In the first tilt rotation range, even if an attempt is made to remove the lower camera case 204 that covers the external AF unit 215, it cannot be removed. This is because at least a part of the semicylindrical portions 204a of the lower camera case 204 is positioned inside the cutout parts 306a of a substantially semicircular shape of the inner case 306 and engages with the cutout parts 306a causing them to interfere with each other. This prevents the user from easily moving the eccentric pin 215c of the external AF unit 215 from the outside, thus ensuring tamper resistance.

Figure 6:
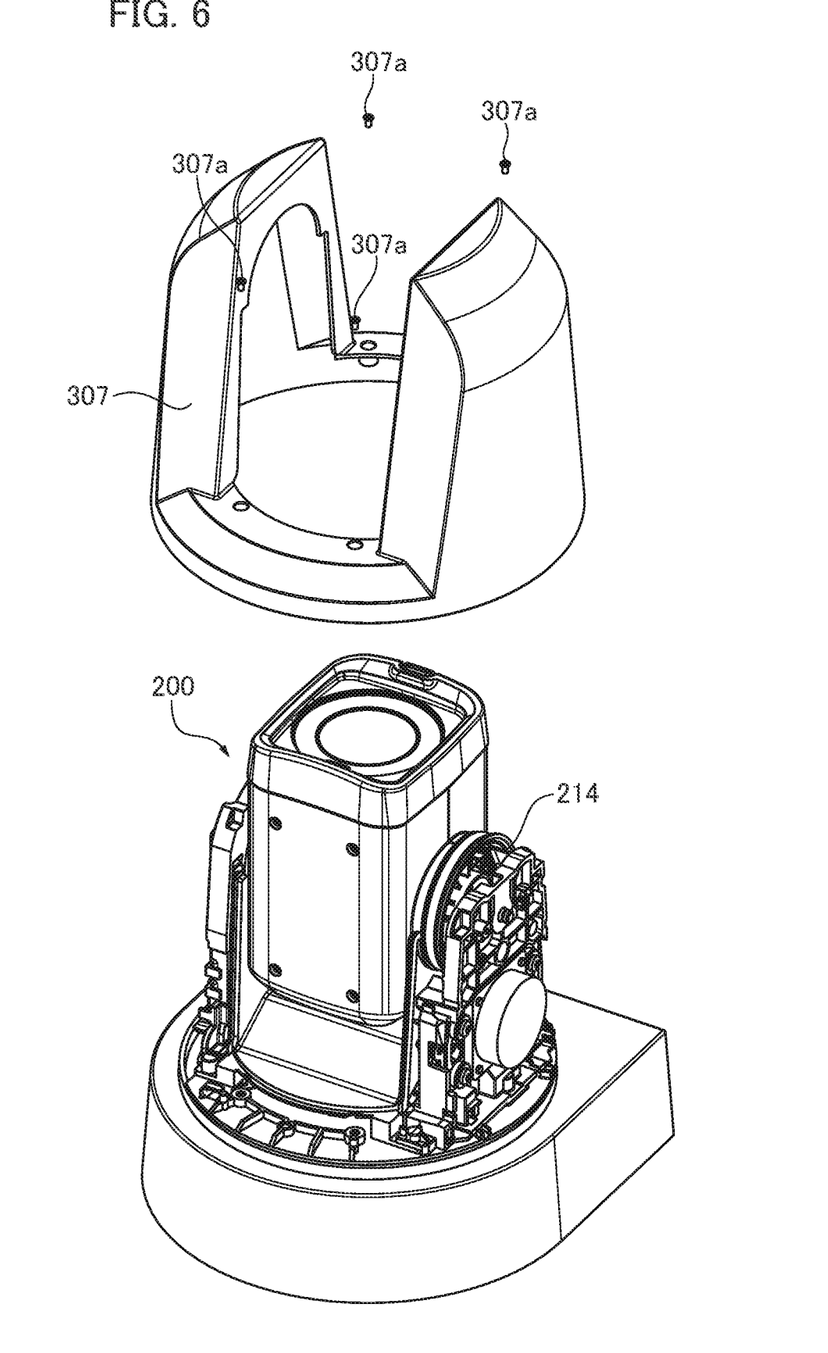
FIG. 6 is a perspective view of the image pickup device in the state of adjustment procedure 1 for the orientation of the external AF unit.
Figure 7:
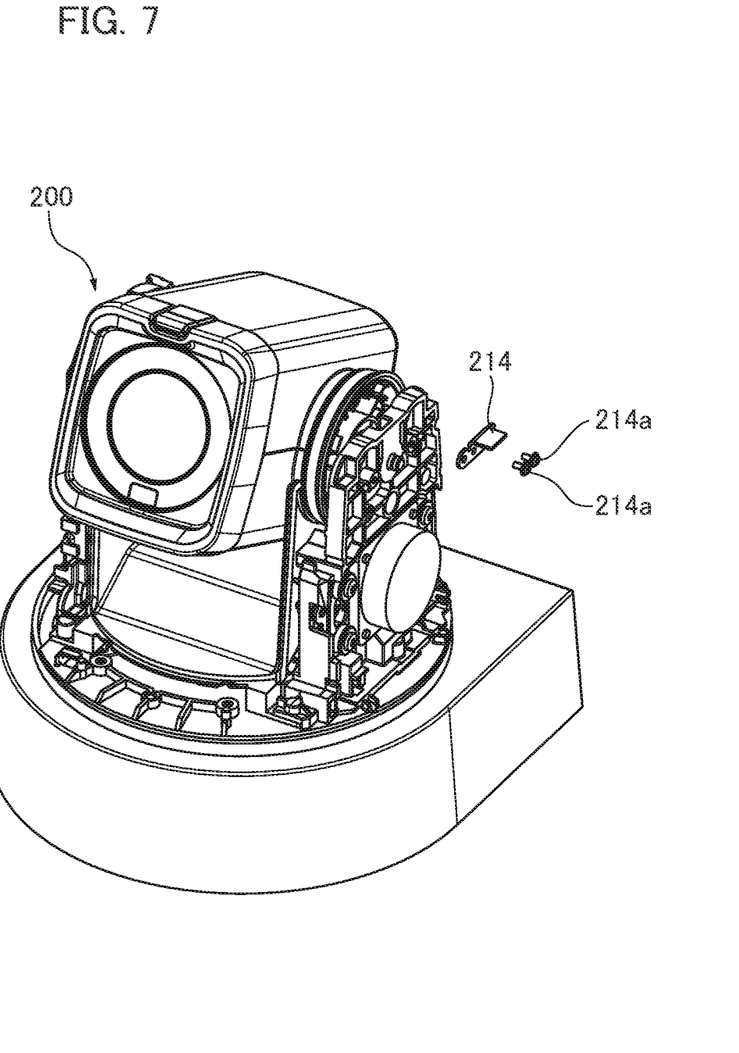
FIG. 7 is a perspective view of the image pickup device in the state of adjustment procedure 2 for the orientation of the external AF unit.
Figure 8:
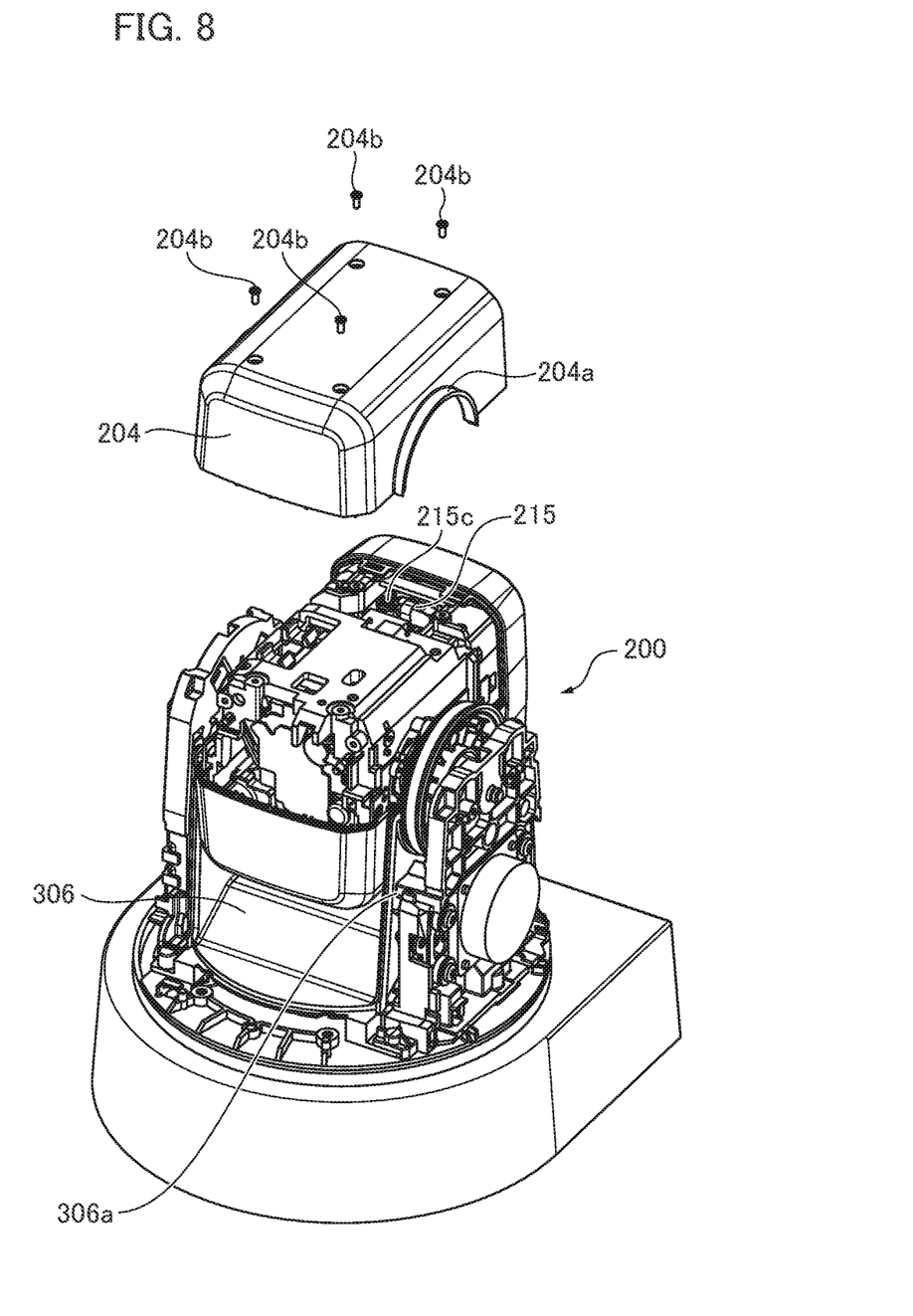
FIG. 8 is a perspective view of the image pickup device in the state of adjustment procedure 3 for the orientation of the external AF unit.
Figure 9:
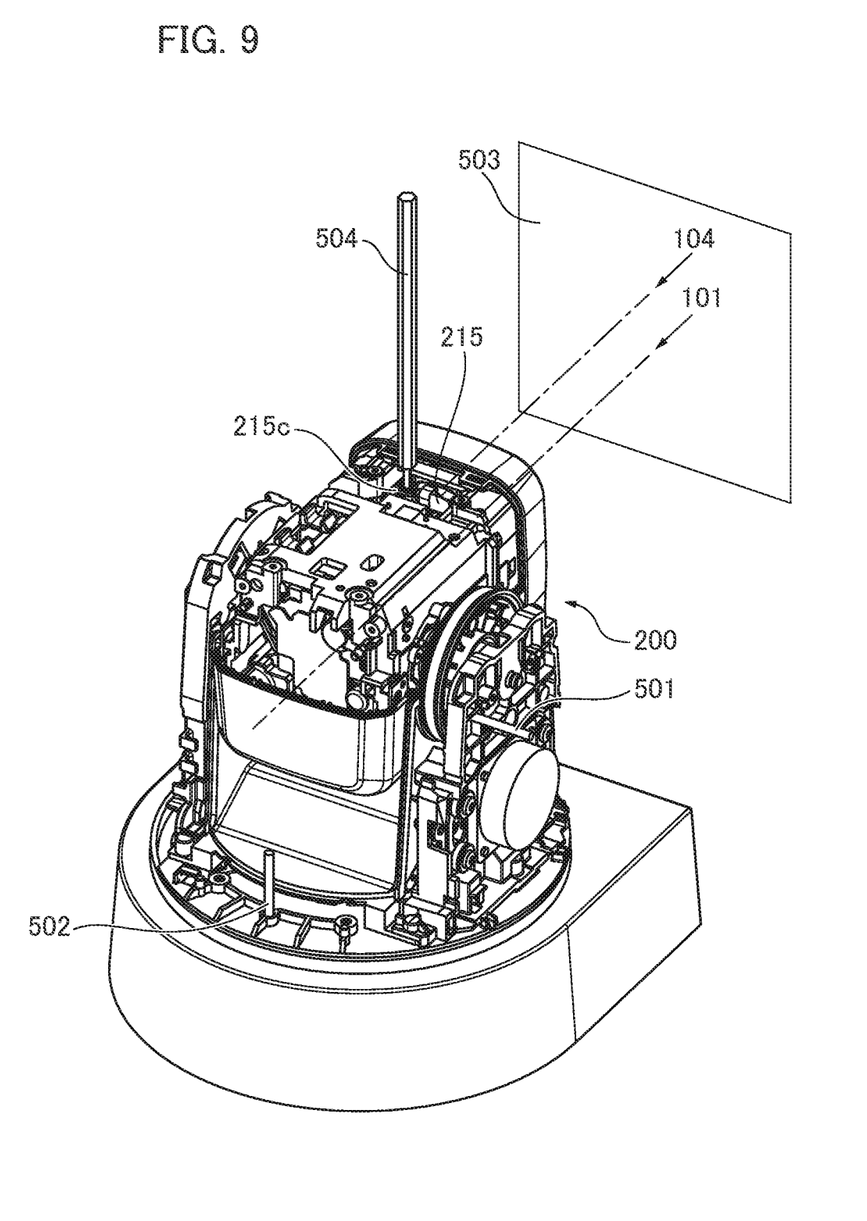
FIG. 9 is a perspective view of the image pickup device in the state of adjustment procedure 4 for the orientation of the external AF unit.
Figure 10A:
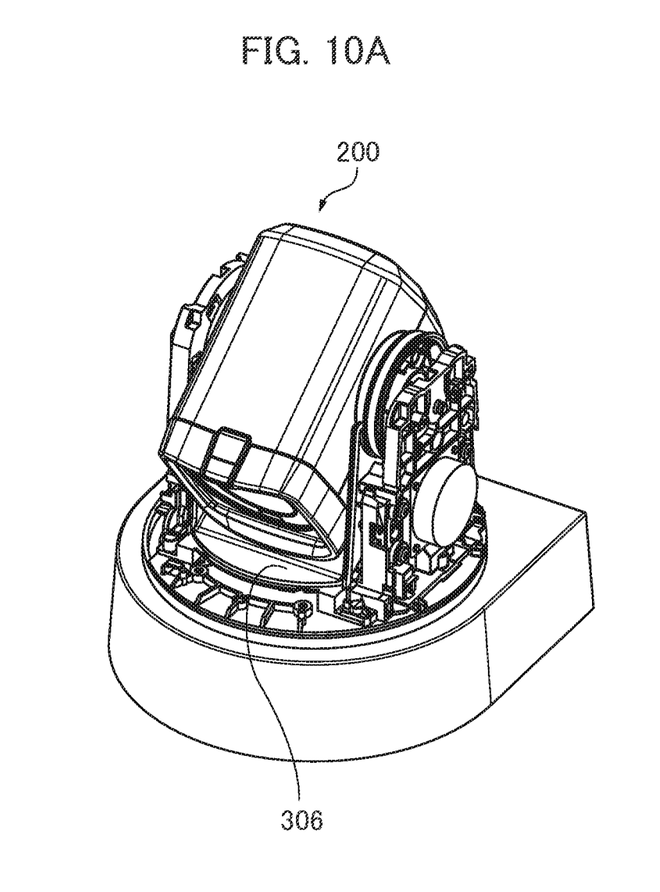
FIG. 10A and FIG. 10B illustrate the second tilt rotation range of the camera unit.

Next, referring to FIGS. 6 to 10, a method of adjusting the orientation of the external AF unit 215 in customer service will be explained. FIG. 6 is a perspective view of the image pickup device 100 in the state of adjustment procedure 1 for the orientation of the external AF unit 215. FIG. 7 is a perspective view of the image pickup device 100 in the state of adjustment procedure 2 for the orientation of the external AF unit 215. FIG. 8 is a perspective view of the image pickup device 100 in the state of adjustment procedure 3 for the orientation of the external AF unit 215. FIG. 9 is a perspective view of the image pickup device 100 in the state of adjustment procedure 4 for the orientation of the external AF unit 215. FIGS. 10A and B are drawings to illustrate the second tilt rotation range of the camera unit 200.

First, as illustrated in FIG. 6, the tilt angle is set to approximately +90°, and the outer case 307 is removed by loosening the fixing screws 307a to expose the tilt rotation regulating member 214 to the outside.

Figure 10B:
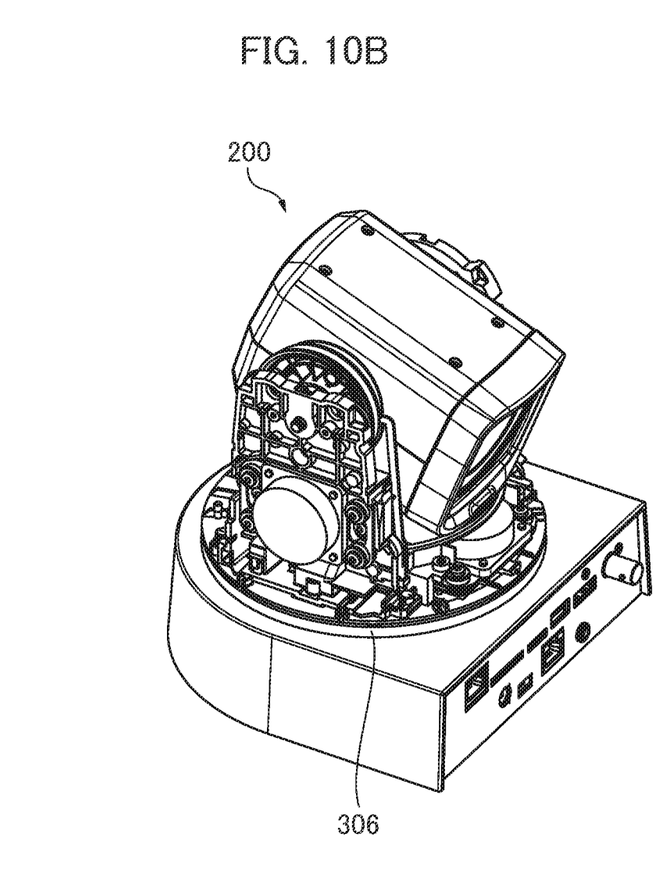

Next, as illustrated in FIG. 7, the tilt angle is set to approximately +20°, and the tilt rotation regulating member 214 is removed by loosening the fixing screws 214a. By removing the tilt rotation regulating member 214, the abutting of the tilt rotation regulating member 214 described above against the convex shape 301d provided on the first pan base 301a will no longer occur, and the camera unit 200 will be tilt rotatable up to the second tilt rotation range. In the present embodiment, as illustrated in FIGS. 10A and B, the camera unit 200 is tilt rotatable until it abuts the inner case 306. FIG. 10A illustrates a state of a tilt angle of −40°, and FIG. 10B illustrates a state of a tilt angle of +195°. In the present embodiment, the second tilt rotation range is, as an example, between −40° and −35° and between +105° and +195°. The second tilt rotation range is a tilt rotation range that does not overlap with the first tilt rotation range within the range in which the camera unit 200 is tilt rotatable by removing the tilt rotation regulating member 214.

Next, in the second tilt rotation range, at an angle where the installation surface and the optical axis 101 of the imaging system are approximately parallel, all of the semi-cylindrical portions 204a of the lower camera case 204 are disposed outside the cutout parts 306a of a substantially semicircular shape of the inner case 306. Thus, as illustrated in FIG. 8, the lower camera case 204 is removable by loosening the fixing screws 204b. In the present figure, the tilt angle of +180° is shown. In a state that the lower camera case 204 is removed, the external AF unit 215 is exposed to the outside. In addition, at a tile angle of 180° of the second tilt rotation range, the external AF unit 215 is disposed at the opposite side of the pan base 301 with respect to the optical axis 101 of the imaging system. In other words, at an angle where the installation surface and the optical axis 101 of the imaging system are substantially parallel, where the optical axis 101 of the imaging system serves as a reference, the pan base 301 is placed on one side and the external AF unit 215 is placed on the other side. This allows adjustments to be made to the external AF unit 215.

Finally, as illustrated in FIG. 9, a tilt angle fixing pin 501 is inserted into tilt angle fixing holes 213a (illustrated in FIG. 3) provided on the tilt gear 213 and a tilt angle fixing hole 301e (illustrated in FIG. 4) provided on the first pan base 301a. A pan angle fixing pin 502 is then inserted into a pan angle fixing hole 401a provided on the bottom case 401 (illustrated in FIG. 5) and a pan angle fixing hole 301f provided on the third pan base 301c (illustrated in FIG. 4). This allows the camera unit 200 to be fixed at a predetermined rotation angle. Here, as an example, it is assumed that the camera can be fixed at a pan angle of +0° and a tilt angle of +180°. In this state, it is possible place the camera unit 200 directly opposed to a chart 503 installed on a wall, and because the eccentric pin 215c of the external measuring AF unit 215 is exposed at the top portion, the eccentric pin 215c can be easily rotated with an adjustment tool 504. Therefore, as it is preferable that the tilt angle +180 is included in the second tilt rotation range, it is preferable that the first tilt rotation range has a maximum tilt angle of less than 180° and the second tilt rotation range has a maximum tilt angle of +180° or greater.

Note that in the present embodiment, the tilt rotation regulating member is provided on the camera unit, and the convex shape that the tilt rotation regulating member abuts is provided on the pan unit. However, the tilt rotation regulating member can be provided on the pan unit and the convex shape that the tilt rotation regulating member abuts may be provided on the camera unit.

In the above-described configuration, the user cannot easily move the eccentric pin for adjusting the orientation of the external AF unit, which provides excellent tamper-resistance. On the other hand, in customer service, without the need to remove many parts and in a state where images can be output, the orientation of the external AF unit is easily adjustable.

Other Embodiments

Above, while the present invention has been described with reference to exemplary embodiments, it is to be understood that the invention is not limited to the disclosed exemplary embodiments and various alternative changes are possible within the summary range. For example, in the case where the installation surface is a wall, the above-described embodiment can be applied by replacing the tilt direction with the pan direction and the pan direction with the tilt direction. In this case, the camera unit 200 is placed to be directly opposed to a chart mounted on a ceiling or a floor.

This application claims the benefit of Japanese Patent Application No. 2020-210620, filed Dec. 18, 2020, which is hereby incorporated by reference wherein in its entirety.

What is claimed is:

1. An image pickup device comprising:
a camera unit configured to include a lens barrel;
an autofocus unit disposed on an outside of the lens barrel;
a tally lamp disposed on an opposite side of the autofocus unit with respect to the lens barrel; and
a base member configured to support the camera unit rotatably around a rotation axis.

2. The image pickup device according to claim 1,
wherein the base member supports the camera unit in a tilt rotatable manner
wherein the autofocus unit is disposed in one side with respect to a tilt axis,
wherein the tally lamp is disposed in other side with respect to the tilt axis.

3. The image pickup device according to claim 1, further comprising a regulating member configured to restrict rotation of the camera unit to a first rotation range;
wherein the camera unit includes a lens barrel holding member that holds the lens barrel, a camera case that engages the lens barrel holding member and covers the autofocus unit;
wherein when the camera unit is in the first rotation range, the camera case engages with the lens barrel holding member and,
wherein when the regulating member is removed and the camera unit is in a second rotation range, the camera case is removable from the lens barrel holding member.

4. The image pickup device according to claim 3,
wherein when the camera unit is in the second rotation range, the autofocus unit is disposed on an opposite side of the base member with respect to an optical axis of the lens barrel.

5. The image pickup device according to claim 3,
wherein, in a state that the camera case is removed, the autofocus unit is exposed to outside.

6. The image pickup device according to claim 3,
wherein when the camera unit is in the first rotation range, the camera case cannot be removed from the lens barrel holding member.

7. The image pickup device according to claim 3 further comprising a base case configured to cover the base member,
wherein the camera case has semicylindrical portions,
wherein the base case has cutout parts of a substantially semicircular shape,
wherein, in the first rotation range, at least a part of the semicylindrical portions of the camera case is positioned inside the cutout parts of the base case and engages with the cutout parts, and
wherein, in the second rotation range, all of the semicylindrical portions of the camera case are positioned on an outside of the cutout parts of the base case.

8. The image pickup device according to claim 3,
wherein the regulating member is formed of sheet metal.

9. The image pickup device according to claim 3,
wherein, in the second rotation range, the camera unit and the base member have holes that enable the camera unit to be fixed at a predetermined rotation angle by inserting a pin.

10. The image pickup device according to claim 9,
wherein the predetermined rotation angle is a rotation angle, wherein an installation surface and the optical axis of the lens barrel are substantially parallel to each other.

11. The image pickup device according to claim 9,
wherein the predetermined rotation angle is a tilt angle of 180°.

12. The image pickup device according to claim 3,
wherein the first rotation range has a maximum tilt angle of less than 180°, and the second rotation range has a maximum tilt angle of 180° or greater.

13. The image pickup device according to claim 1,
wherein the autofocus unit is provided with an autofocus sensor that differs from an image sensor provided by the camera unit.

* * * * *